(12) United States Patent
Takenaka et al.

(10) Patent No.: US 7,911,091 B2
(45) Date of Patent: Mar. 22, 2011

(54) COOLING STRUCTURE AND COOLING METHOD OF ROTATING ELECTRICAL MACHINE

(75) Inventors: Masayuki Takenaka, Anjo (JP); Hiroaki Sanji, Anjo (JP); Tomohiko Miyamoto, Toyota (JP); Ryuta Ishida, Okazaki (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 195 days.

(21) Appl. No.: 12/216,909

(22) Filed: Jul. 11, 2008

(65) Prior Publication Data
US 2009/0015081 A1  Jan. 15, 2009

(30) Foreign Application Priority Data
Jul. 13, 2007  (JP) ................. 2007-184908

(51) Int. Cl.
*H02K 1/32* (2006.01)
*H02K 9/19* (2006.01)
(52) U.S. Cl. .................. 310/54; 310/58; 310/156.57
(58) Field of Classification Search .............. 310/54, 310/58
See application file for complete search history.

(56) References Cited

U.S. PATENT DOCUMENTS

| | | | |
|---|---|---|---|
| 3,840,763 A * | 10/1974 | Baumann et al. | ........ 310/156.56 |
| 5,889,342 A | 3/1999 | Hasebe et al. | |
| 6,234,767 B1 | 5/2001 | Takeda et al. | |
| 6,329,734 B1 * | 12/2001 | Takahashi et al. | ....... 310/156.56 |
| 7,122,930 B2 | 10/2006 | Yamagishi et al. | |
| 2001/0017499 A1 * | 8/2001 | Kaneko et al. | ............ 310/156.38 |
| 2006/0113851 A1 * | 6/2006 | Ishihara et al. | .................. 310/52 |
| 2007/0052313 A1 | 3/2007 | Takahashi et al. | |
| 2009/0261667 A1 * | 10/2009 | Matsubara et al. | ............. 310/54 |

FOREIGN PATENT DOCUMENTS

| | | | |
|---|---|---|---|
| JP | A 48-77303 | | 10/1973 |
| JP | U 61-84663 | | 6/1986 |
| JP | 09-070156 A | * | 3/1997 |
| JP | A 09-182374 | | 7/1997 |
| JP | A 11-27881 | | 1/1999 |
| JP | A 11-113202 | | 4/1999 |
| JP | A 11-318055 | | 11/1999 |
| JP | A 2002-51503 | | 2/2002 |
| JP | A 2002-345188 | | 11/2002 |
| JP | A 2003-324901 | | 11/2003 |
| JP | A 2007-104888 | | 4/2007 |
| JP | A 2007-174755 | | 7/2007 |

* cited by examiner

*Primary Examiner* — Burton Mullins
(74) *Attorney, Agent, or Firm* — Oliff & Berridge, PLC

(57) ABSTRACT

A cooling structure of a rotating electrical machine including a stator and a rotor, the cooling structure including magnet accommodating holes provided in a rotor core of the rotor, the magnet accommodating holes extend between axial core end faces of the rotor core, wherein permanent magnets are accommodated in the magnet accommodating holes; a plurality of voids, which prevent leakage flux, in contact with the permanent magnets and extending between the axial core end faces; and a rotor cooling-liquid supply passage that supplies cooling liquid to one core end face, wherein the cooling liquid supplied from the rotor cooling-liquid supply passage is introduced into the voids to prevent leakage flux, and the permanent magnets are cooled by the cooling liquid flowing through the voids.

18 Claims, 8 Drawing Sheets

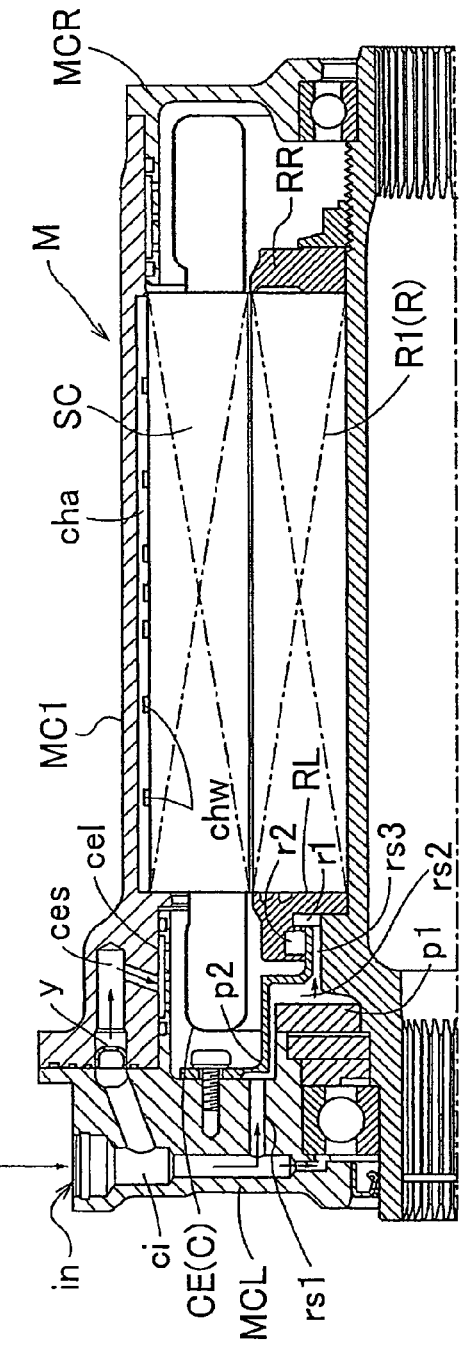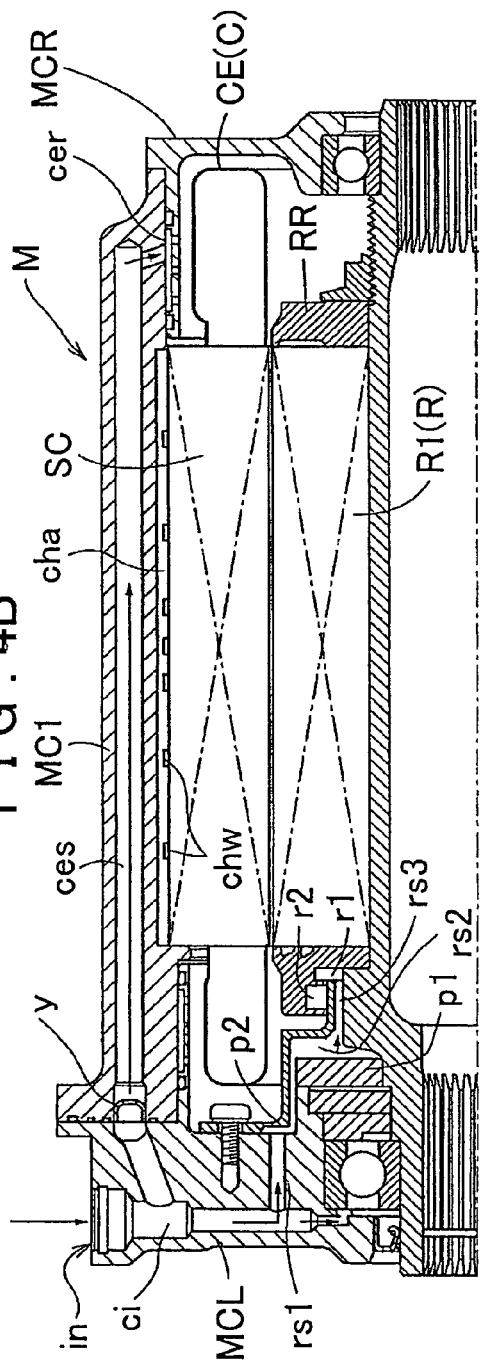
FIG. 4A
FIG. 4B

COOLING STRUCTURE AND COOLING METHOD OF ROTATING ELECTRICAL MACHINE

INCORPORATION BY REFERENCE

The disclosure of Japanese Patent Application No. 2007-184908 filed on Jul. 13, 2007 including the specification, drawings and abstract is incorporated herein by reference in its entirety.

BACKGROUND

The present invention relates to a cooling structure and cooling method of a rotating electrical machine.

A structure described in Japanese Patent Application Publication No. JP-A-H9-182374 and a structure described in Japanese Patent Application Publication No. JP-A-2002-345188 have been proposed as a cooling structure of a rotating electrical machine.

Japanese Patent Application Publication No. JP-A-H9-182374 discloses an axial oil passage (32 in JP-A-H9-182374; the same below) that is provided, as a cooling circuit of a motor, radially inside of permanent magnets (31) and axially extends through a core (30); and a supply device (5) that supplies oil to the oil passage. In this example, as can be seen from FIG. 4 of JP-A-H9-182374, a part of a rotor core (rotor iron core) is interposed between the axial oil passage (32) and the permanent magnets (31), and the permanent magnets (31) are cooled indirectly (through the part of the rotor core) by a cooling liquid flowing through the axial oil passage (32).

Japanese Patent Application Publication No. JP-A-2002-345188 is an application relating to a rotating electrical machine, and this rotating electrical machine also includes a plurality of permanent magnets (12 in JP-A-2002-345188; the same below) at positions close to the outer periphery of a rotor. In this example, each magnet insertion hole (16) formed in a rotor core has a hole portion on its inner diameter side, and each hole portion has a triangular shape with an apex located on its inner diameter side. These hole portions serve as a cooling passage (15) through which cooling liquid flows. In this example, the cooling liquid flows in direct contact with the pole faces of the permanent magnets (12). Therefore, the permanent magnets (12) can be directly cooled.

SUMMARY

In a rotating electrical machine having a permanent magnet in a rotor, irreversible demagnetization of the permanent magnet may occur due to the heat as the temperature of the permanent magnet rises. Therefore, as in the related art, the permanent magnet is cooled by supplying a cooling liquid such as oil to a rotor core. However, the above examples of the related art have the following problems.

In the technology disclosed in JP-A-H9-182374, the permanent magnets are indirectly cooled by the cooling liquid through the rotor core. Therefore, the cooling capability is limited, leaving room for improvement.

In the technology disclosed in JP-A-2002-345188, the cooling liquid flows in direct contact with the pole faces of the permanent magnets. Therefore, a certain level of cooling capability can be expected. In addition, the cooling passage extends across a magnetic path of the permanent magnets. Therefore, magnetic flux distribution is disturbed by the presence of the cooling passage, and the full capability that is supposed to be obtained by the rotating electrical machine cannot be obtained sufficiently.

The present invention thus provides a cooling structure of a rotating electrical machine capable of providing a relatively high cooling capability regarding the cooling of permanent magnets provided in a rotor, and, at the same time, capable of providing a rotating electrical machine with a small disturbance of magnetic flux distribution between a rotor core and a stator core. The present invention is also able to achieve various other advantages.

According to an exemplary aspect of the invention, a cooling structure of a rotating electrical machine including a stator and a rotor, the cooling structure including magnet accommodating holes provided in a rotor core of the rotor, the magnet accommodating holes extend between axial core end faces of the rotor core, wherein permanent magnets are accommodated in the magnet accommodating holes; a plurality of voids, which prevent leakage flux, in contact with the permanent magnets and extending between the axial core end faces; and a rotor cooling-liquid supply passage that supplies cooling liquid to one core end face, wherein the cooling liquid supplied from the rotor cooling-liquid supply passage is introduced into the voids to prevent leakage flux, and the permanent magnets are cooled by the cooling liquid flowing through the voids.

According to another exemplary aspect of the invention, a method for cooling a rotating electrical machine including a stator and a rotor with a cooling structure that includes magnet accommodating holes provided in a rotor core of the rotor so as to extend between axial core end faces of the rotor core, wherein permanent magnets are accommodated in the magnet accommodating holes, and a plurality of voids that prevent leakage flux in contact with the permanent magnets so as to extend between the axial core end faces of the rotor core, the method includes supplying a cooling liquid to one core end face, wherein the supplied cooling liquid is introduced into the voids that prevent leakage flux, and the permanent magnets are cooled by the cooling liquid flowing through the voids.

BRIEF DESCRIPTION OF THE DRAWINGS

Various exemplary aspects of the invention will be described with reference to the drawings, wherein:

FIGS. 4A and 4B are cross-sectional views along the rotating shaft that show a cooling-liquid supply passage to outer-diameter portions of left and right coil ends;

DETAILED DESCRIPTION OF EMBODIMENTS

Hereinafter, a rotating electrical machine M using a cooling structure of a rotating electrical machine according to the present invention will be described with reference to the figures.

Figure 1:
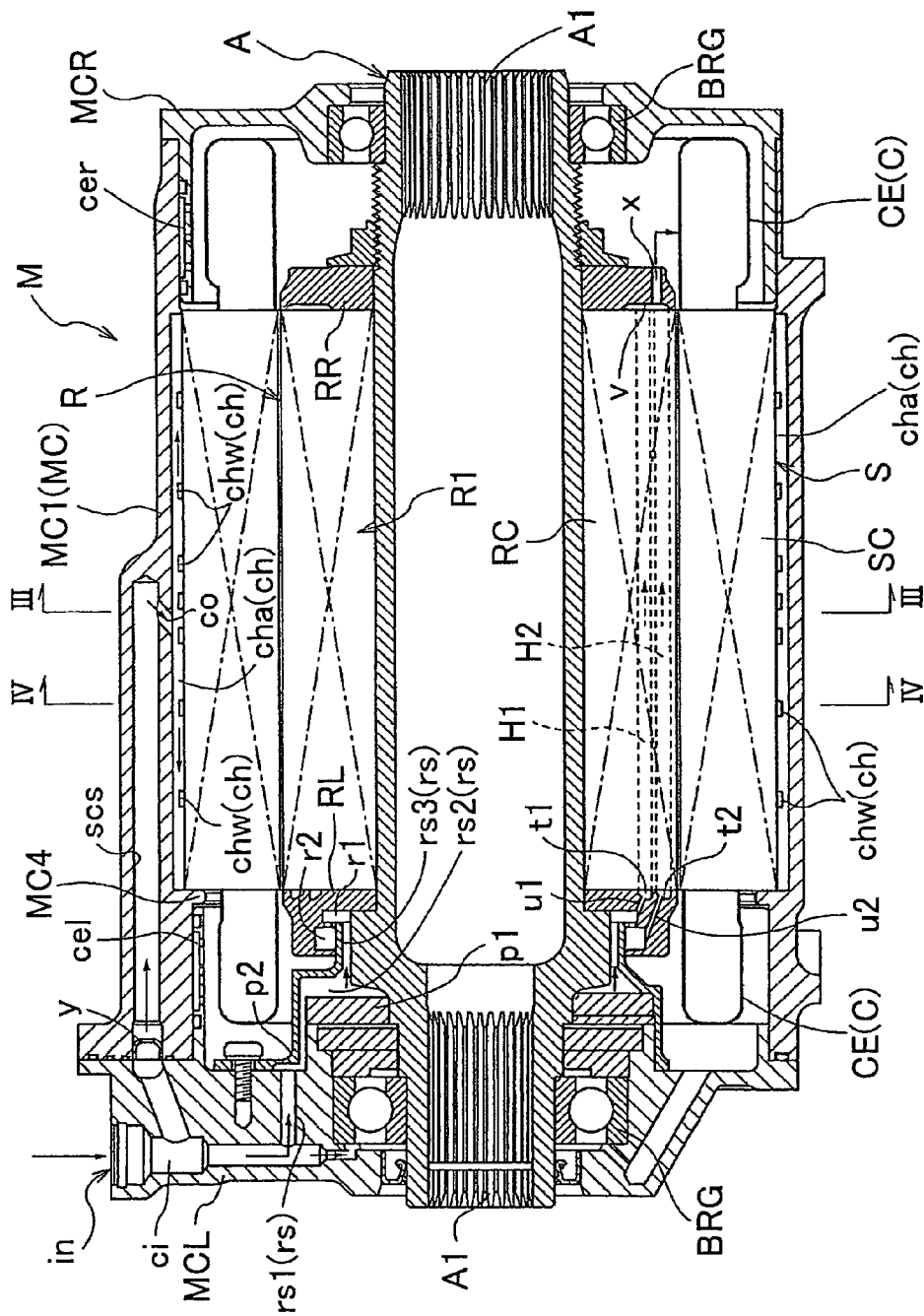
FIG. 1 is a cross-sectional view along a rotating shaft of a cooling structure of a rotating electrical machine according to the present invention.
Figure 2:
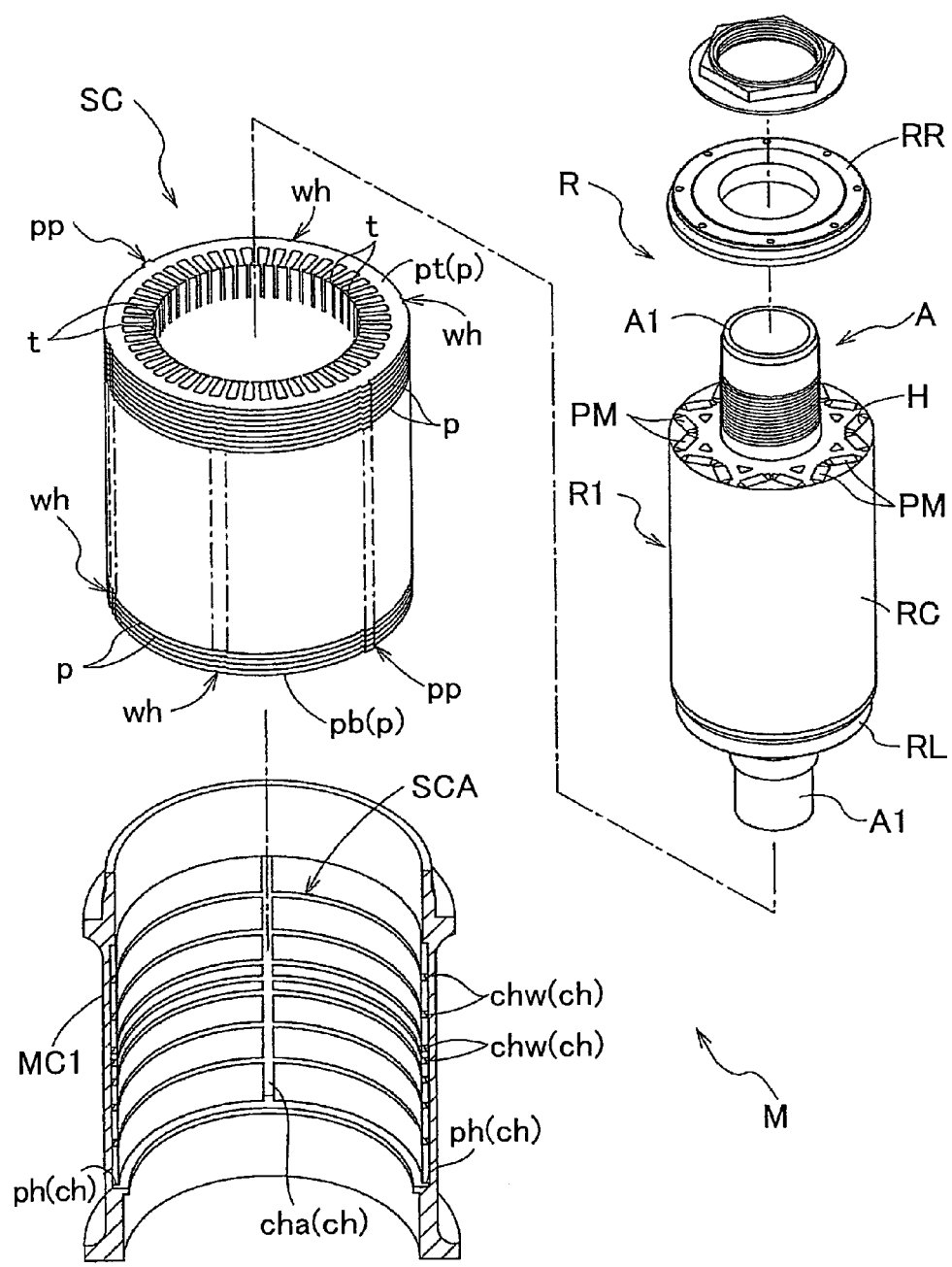
FIG. 2 is an exploded perspective view of the cooling structure of the rotating electrical machine according to the present invention.
Figure 3A:
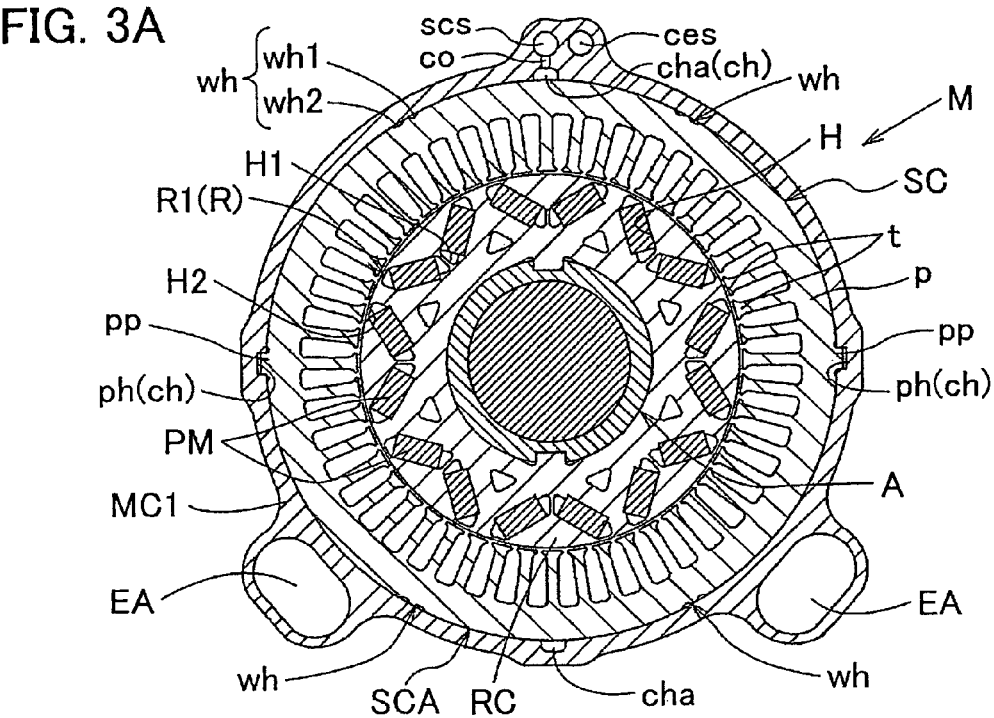
FIG. 3A is a cross-sectional view taken along line III-III in FIG. 1
Figure 3B:
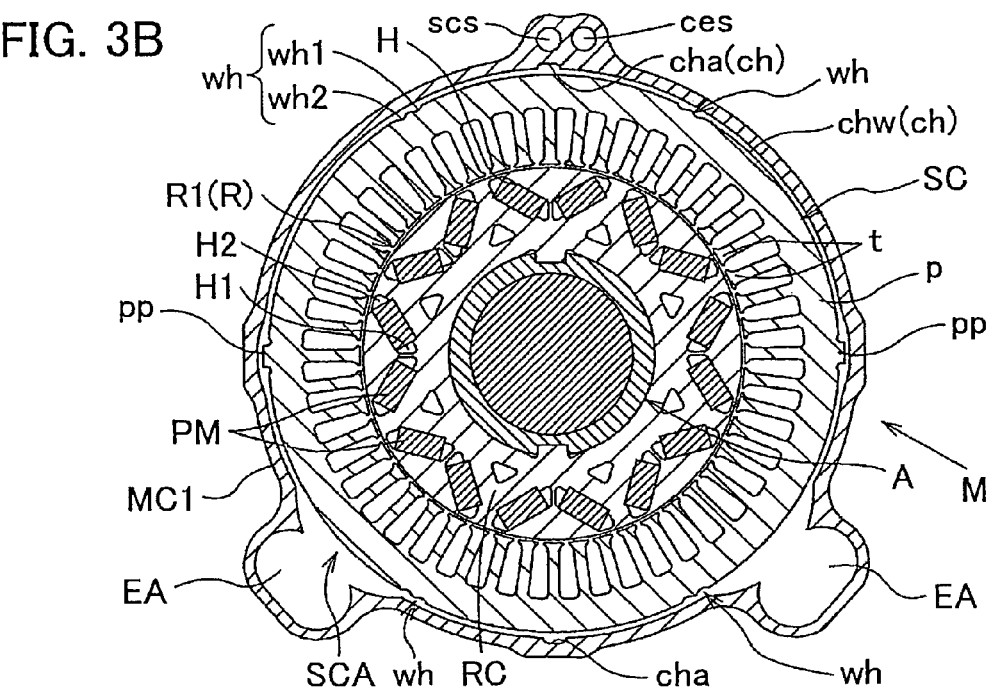
FIG. 3B is a cross-sectional view taken along line IV-IV in FIG. 1.

FIG. 1 is a cross-sectional view along a rotating shaft A of a rotating electrical machine M using a cooling structure of a rotating electrical machine according to the present invention. FIG. 2 is an exploded perspective view illustrating an outline of the structure of the rotating electrical machine M. FIG. 3A shows a cross section taken along line III-III in FIG. 1 and FIG. 3B shows a cross section taken along line IV-IV in FIG. 1. FIGS. 3A and 3B show different positions in the direction of the rotating shaft A. In FIG. 3A, no circumferential cooling liquid flow passage is formed between an inner-diameter surface of a case MC and an outer-diameter surface of a stator core SC. In FIG. 3B, on the other hand, a circumferential cooling liquid flow passage is formed between the inner-diameter surface of the case MC and the outer-diameter surface of the stator core SC.

Figure 5:
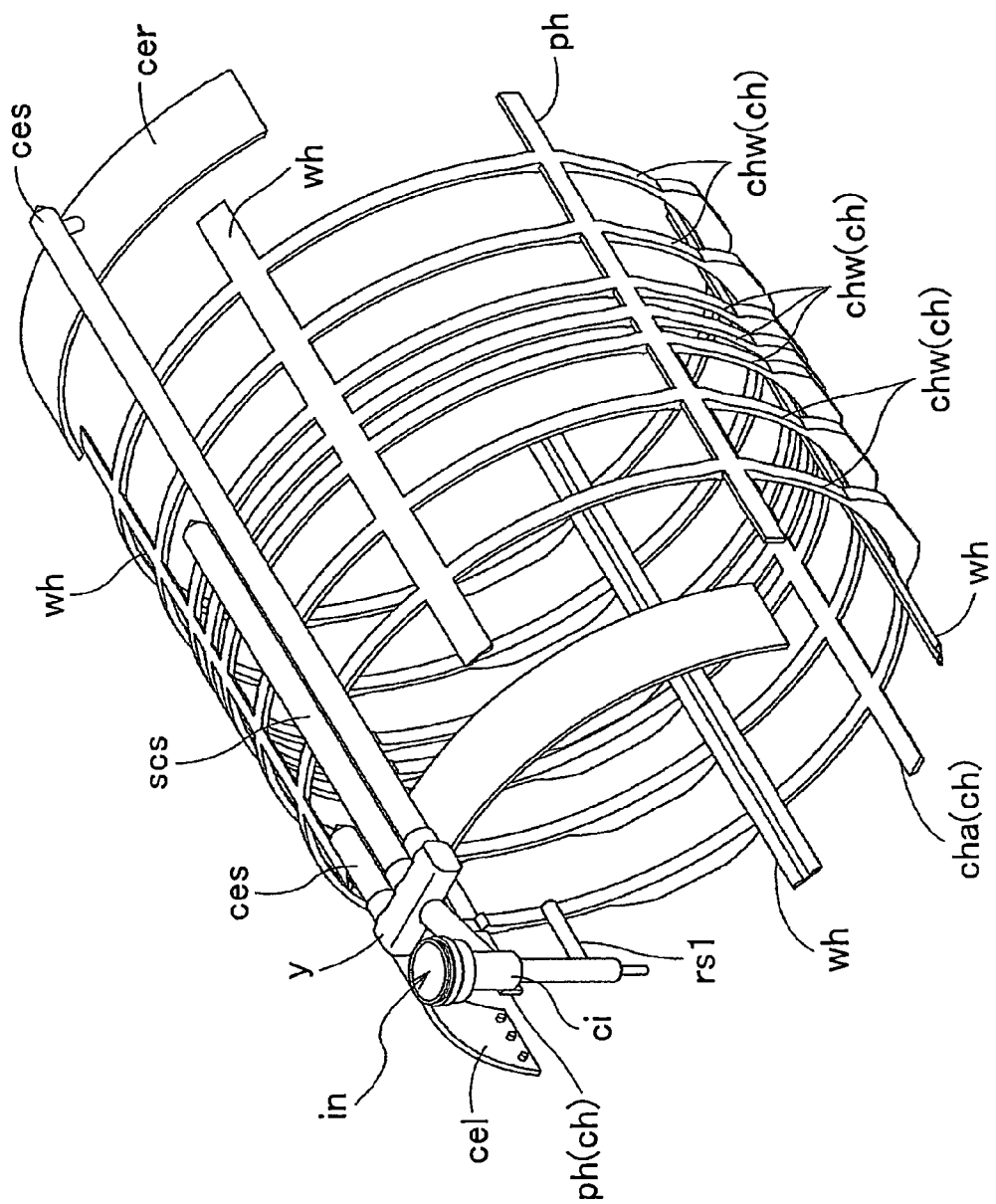
FIG. 5 is a schematic view of a supply structure for supplying a cooling liquid around a stator core.
Figure 7:
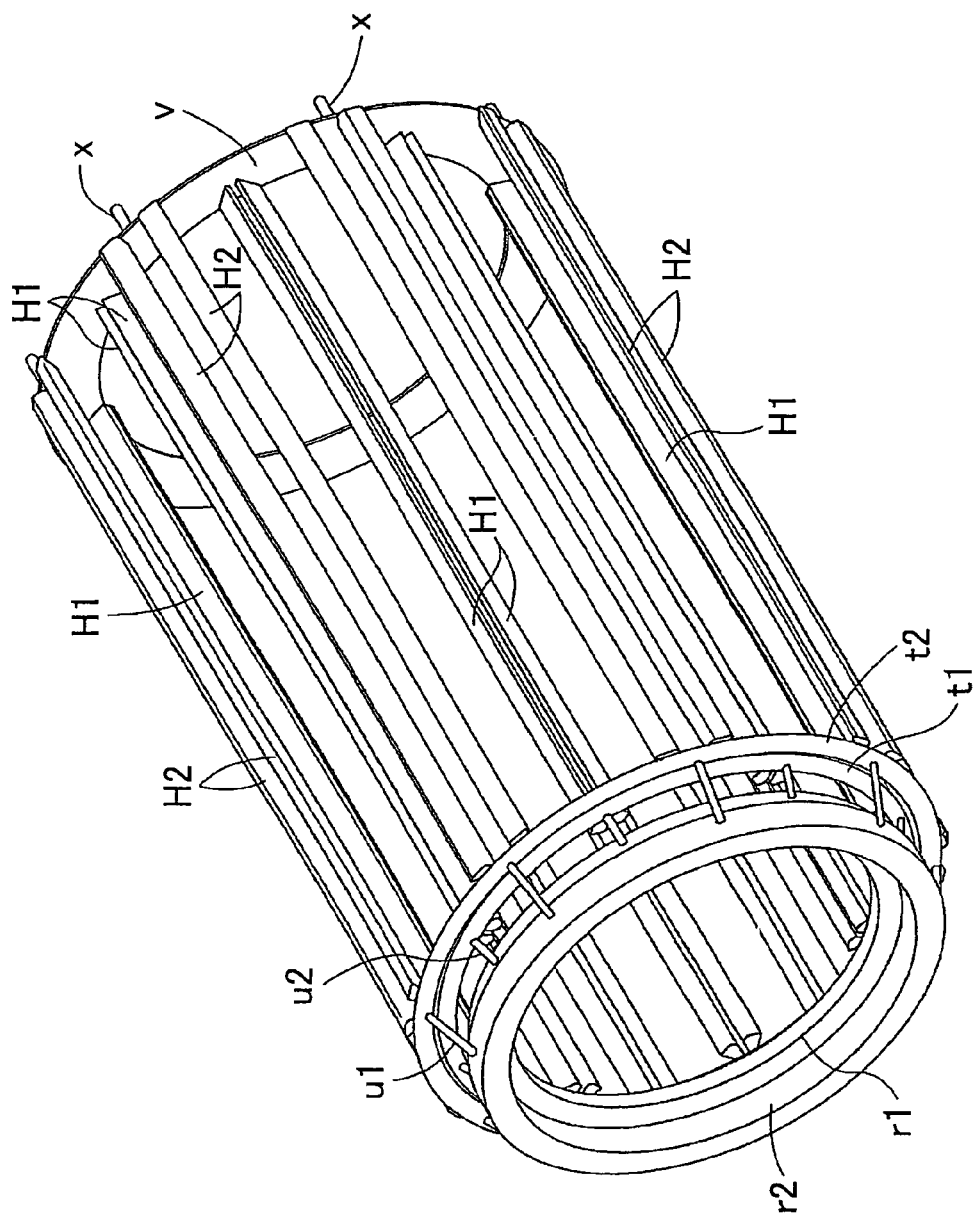
FIG. 7 is a schematic view of a supply structure for supplying a cooling liquid to a rotor.

FIGS. 4A and 4B show a supply structure of a cooling liquid for cooling coil ends CE of a coil C wound around a stator S. FIG. 5 schematically shows a supply structure of a cooling liquid for cooling the stator core SC and the coil ends CE. FIG. 7 schematically shows a supply structure of a cooling liquid for cooling a rotor R.

As shown in FIG. 1, the rotating electrical machine M is structured so that the stator S and the rotor R are accommodated in a cylindrical case main body MC1. The stator S is fixed to the case main body MC1. The rotor R is rotatably supported by a pair of left and right covers MCL, MCR that respectively cover openings at both ends of the case main body MC1.

The rotor R includes a rotating shaft A rotatably supported by the pair of covers MCL, MCR through a supporting bearing BRG, and a rotor main body R1 held between retainers RL, RR in the center of the rotating shaft A. As described in detail later, bar-shaped permanent magnets PM extending in the axial direction of the rotating shaft A are accommodated and mounted in the rotor main body R1.

The rotating shaft A includes a connecting portion A1 at both ends for connecting with another transmission shaft (out of the figure), whereby a driving force generated by the rotating electrical machine M can be output to the outside of the rotating electrical machine M. In other words, the rotating shaft A is structured so that, for example, the rotating shaft A can receive a driving force generated by an internal combustion engine (engine; out of the figure) at its one side, add a driving force generated by the rotating shaft A itself to the received driving force, and output the resultant driving force to the other side, or the rotating shaft A can start the internal combustion engine by using the driving force generated by the rotating electrical machine M. Moreover, with driving force transmitted from the outside to the rotating electrical machine, the rotating electrical machine M can operate as a generator.

The stator S includes a stator core SC fixed to the case main body MC1. The coil ends CE of the coil C wound around the stator core SC are located outside both axial ends of the stator core SC.

As can be seen from FIG. 2, the stator core SC is formed by laminating a multiplicity of substantially ring-shaped steel plates p in the axial direction of the rotating shaft A. FIGS. 3A and 3B show the steel plates p viewed from the axial direction.

Each steel plate p has a number of teeth t on its inner-diameter side. The coil C described above is wound in a predetermined state between the teeth t. On the other hand, a welding groove wh for welding the multiplicity of laminated steel plates p together is formed at four positions in the circumferential direction on the outer-diameter side of each steel plate p. A positioning projection pp that is inserted in a positioning groove ph formed in the case main body MC1 to fix the steel plates p in the circumferential direction of the rotating shaft A is formed at two positions in the circumferential direction.

Each welding groove wh extends across the whole region (the region from the bottom steel plate pb to the top steel plate pt in FIG. 2) of the steel plates p in the laminating direction (the same direction as the axial direction of the rotating shaft) as a groove that is recessed toward the inner-diameter side. Moreover, as can be seen from FIGS. 3A and 3B, each welding groove wh is structured by a pair of groove portions wh1, wh2 formed adjacent to each other.

Each positioning projection pp extends across the whole region of the steel plates p in the laminating direction as a projection protruding toward the outer-diameter side of the steel plates p.

As shown in FIG. 1, the outer-diameter line of the stator core SC is a straight line along the rotating shaft A when viewed in cross section along the rotating shaft A of the rotating electrical machine M.

A coil C (called a stator coil) is wound around this stator core SC. The coil C is impregnated with varnish (out of the figure) and the shape of the coil C is fixed in an insulating state. Moreover, the gap between each steel plate p and insulating paper is also impregnated with varnish, whereby thermal conductivity between the stator core and the coil is improved and the heat dissipation property is improved.

Positioning of the stator S will now be described. The following structure is used to position the stator S: the position of the stator S in the axial direction of the rotating shaft A is determined by placing one axial end of the stator core SC (the left end in the example shown in FIG. 1) against a seat MC4 provided in the case MC. As can be seen from FIG. 1, this positioning is implemented as follows: with the left cover MCL fixed to the case main body MC1, the stator S is housed in the case MC and the right cover MCR is then fixed to the case main body MC1.

On the other hand, the position of the stator S in the radial direction of the rotating shaft A is determined by shrink fitting the stator core SC in the case main body MC1. Moreover, the position of the stator S in the circumferential direction of the rotating shaft A is determined by fitting the positioning projections pp into the respective positioning grooves ph formed in the case MC.

The following structure is thus used in the rotating electrical machine M of the present invention: as shown in FIG. 3A, the outer-diameter surface of the stator core SC is in direct contact with the inner-diameter surface of the case MC except for the region where each case-side cooling-liquid groove ch as in the present invention is provided in the inner-diameter surface of the case MC, the region where each welding groove wh is formed in the stator core, or the region where each positioning projection pp is formed.

The outline of the structure of the rotating electrical machine M using the cooling structure of the rotating electrical machine according to the present invention has been described above. Hereinafter, a cooling structure of the stator S and a cooling structure of the rotor R by a cooling liquid which are used in this rotating electrical machine M will be described.

As can be seen from FIG. 1, a cooling liquid inlet in and a common inlet passage ci connected to the inlet in are provided at the top surface of the left cover MCL. The stator core SC, the left and right coil ends CE, and the rotor R can be cooled by supplying a cooling liquid from the common inlet passage ci to an outer-diameter portion of the stator core SC, the coil ends CE, and voids H1 and H2 provided in the case main body MC1.

Cooling of the Stator Core

As shown in FIGS. 1 and 5, a stator-core cooling-liquid supply passage scs extends from the common inlet passage ci to the outer-diameter portion of the stator core SC in order to supply a cooling liquid to this portion. The stator-core cooling-liquid supply passage scs is structured as follows: the stator-core cooling-liquid supply passage scs is generally formed in the case main body MC1 and communicates with the common inlet passage ci at its base end. In the outer-diameter portion of the stator core SC, a central opening co is formed substantially in the center of the case main body MC1 in the axial direction in order to supply a cooling liquid to the outer-diameter portion of the stator core SC.

The structure of supplying a cooling liquid to the outer-diameter portion of the stator core has been described above. Hereinafter, a cooling structure around the stator core SC will be described in detail. In the present invention, in order to cool the stator core SC, case-side cooling-liquid grooves ch that are recessed toward the outer-diameter side are formed in the inner-diameter surface of the case main body MC1. A cooling-liquid flow passage through which a cooling liquid flows is formed between each cooling-liquid groove ch and the outer-diameter surface of the stator core SC, whereby the object of the present invention is achieved.

Case-Side Cooling-Liquid Grooves

The following structure is used in this embodiment: seven circumferential cooling-liquid grooves chw are provided along the circumferential direction of the rotating shaft A as the case-side cooling-liquid grooves ch. Moreover, two axial cooling-liquid grooves cha, that is, upper and lower axial cooling-liquid grooves cha, are provided along the axial direction of the rotating shaft A in order to distribute a cooling liquid, and the positioning grooves ph serve also as the axial cooling-liquid grooves cha.

FIG. 3B shows a state in which the circumferential cooling-liquid grooves chw are formed. The following structure is used: it can be seen that, in the cross section taken along line IV-IV in FIG. 1, a space that forms a cooling-liquid flow passage is formed between the outer-diameter surface of the stator core SC and the inner-diameter surface of the case main body MC1 so as to extend along the whole circumference of the rotating shaft A.

As shown in FIGS. 3A and 3B, electrical-equipment mounting spaces EA for accommodating and mounting electrical equipments (out of the figure) therein are formed at the lower left and right positions of the case MC so as to extend in the axial direction of the rotating shaft A. Each communicating portion for communicating the respective electrical-equipment mounting space EA with a stator-core mounting space SCA in which the stator core SC is mounted is used as a part of each circumferential cooling-liquid groove chw.

Hereinafter, distribution, in the axial direction of the rotating shaft A of the above-described plurality of circumferential cooling-liquid grooves chw will be described. As can be seen from FIG. 1, the number of circumferential cooling-liquid grooves chw is set to be larger in the center of the stator core SC than at the core end faces of the stator core SC. As a result, the central part of the stator core SC which is normally more likely to get hot can be cooled in an excellent manner.

Core-Side Cooling-Liquid Flow Passage Components

In the present invention, the welding grooves wh and the positioning projections pp, which are described above in the structure of the stator core SC, serve to guide a cooling liquid in the axial direction of the rotating shaft A and distribute the cooling liquid to each circumferential cooling-liquid flow passage chw.

In other words, on the outer-diameter surface of the stator core SC of the present invention, core-side cooling-liquid flow passage components (that is, the welding grooves wh and the positioning projections pp) are provided along the axial direction of the rotating shaft A. The core-side cooling-liquid flow passage components wh, pp serve to distribute a cooling liquid in the axial direction. As can be seen from FIGS. 3A and 6, regarding the welding grooves wh, the outer diameter of the stator core SC is recessed toward the inner diameter. Therefore, the welding grooves wh form a cooling-liquid flow passage communicating in the axial direction of the rotating shaft A. On the other hand, a gap is formed in the radial direction between each positioning groove ph and the corresponding positioning projection pp. This gap forms a cooling-liquid flow passage communicating in the axial direction of the rotating shaft A.

With the above structure, as shown in FIG. 5, the rotating electrical machine M of the present invention is structured as follows: a plurality of circumferential cooling-liquid flow passages and a plurality of axial cooling-liquid flow passages are formed around the outer periphery of the cylindrical stator core SC. Moreover, the circumferential cooling-liquid flow passages and the axial cooling-liquid flow passages cross each other and communicate with each other, whereby the cooling liquid is supplied to each part of the outer-diameter surface of the stator core SC.

Moreover, the circumferential cooling-liquid flow passages cross the axial cooling-liquid flow passages formed by the core-side cooling-liquid flow passage components wh, pp and communicate with these axial cooling-liquid flow passages. The cooling liquid is thus supplied to each part of the outer-diameter surface of the stator core SC.

Cooling of the Coil Ends

As shown in FIGS. 1, 4A, 4B, and 5, a pair of coil-end cooling-liquid supply passages ces for supplying the cooling liquid to the left and right coil ends CE extend from the common inlet passage ci to the coil ends CE. These coil-end cooling-liquid supply passages ces are generally provided in the case main body MC1 and communicate with the common inlet passage ci at their respective base ends. The coil-end cooling-liquid supply passages ces are structured as follows: in the outer-diameter portion of the coil ends CE, distributing portions cel, cer for distributing (in this example, distributing to three locations in the axial direction) a cooling liquid in the axial direction of the rotating shaft A are respectively provided in the left and right covers MCL, MCR. The cooling liquid is thus distributed down to the respective outside surfaces (top surfaces) of the coil ends CE through the distributing portions cel, cer. The stator-core cooling-liquid supply passage scs described above and the pair of left and right coil-end cooling-liquid supply passages ces are formed as axial flow passages provided independently in the case main body MC1. The right coil-end cooling-liquid supply passage ces has the distributing portion cer above the right coil end CE, and the left coil-end cooling-liquid supply passage ces has the distributing portion cel above the left coil end CE. The left and right coil ends CE are thus cooled by supplying the cooling liquid from the outer-diameter side to each of the left and right coil ends CE.

The cooling structure of the stator S has been described above. In the rotating electrical machine M, a unique cooling structure is used for the rotor R as well. Hereinafter, the structure of the rotor R and the cooling structure of the rotor R will be described.

Structure of the Rotor

As described above, the rotor R includes a rotor main body R1 around the rotating shaft. The rotor main body R1 is fixed to the rotating shaft A while being held between the retainers RL, RR. As shown in FIGS. 2, 3A and 3B, the rotor main body R1 includes a rotor core RC that is a laminated iron core, and bar-shaped permanent magnets PM accommodated in the outer peripheral portion of the rotor core RC along the whole width of the rotor main body in the axial direction of the rotating shaft A. In other words, magnet accommodating holes H are formed at predetermined positions of the rotor core RC and the permanent magnets PM are respectively accommodated in the magnet accommodating holes H. Each permanent magnet PM has a rectangular parallelepiped shape and is shaped so that the axial length along the rotating shaft A is the longest. Regarding the cross-sectional shape across the rotating shaft A, each permanent magnet PM has a rectangular shape in which one side is about three times as long as the other side. In the present invention, regarding the permanent magnets PM, the faces extending in the axial direction of the rotating shaft A are referred to as follows: a face which corresponds to the longer side of the rectangular shape in the cross section of FIG. 6 and in which each of N and S polarities of the permanent magnet PM is positioned is referred to as a pole face ps, and a face which corresponds to the shorter side in the cross section and faces a commutating pole portion CP is referred to as a commutating pole face cs.

Figure 6:
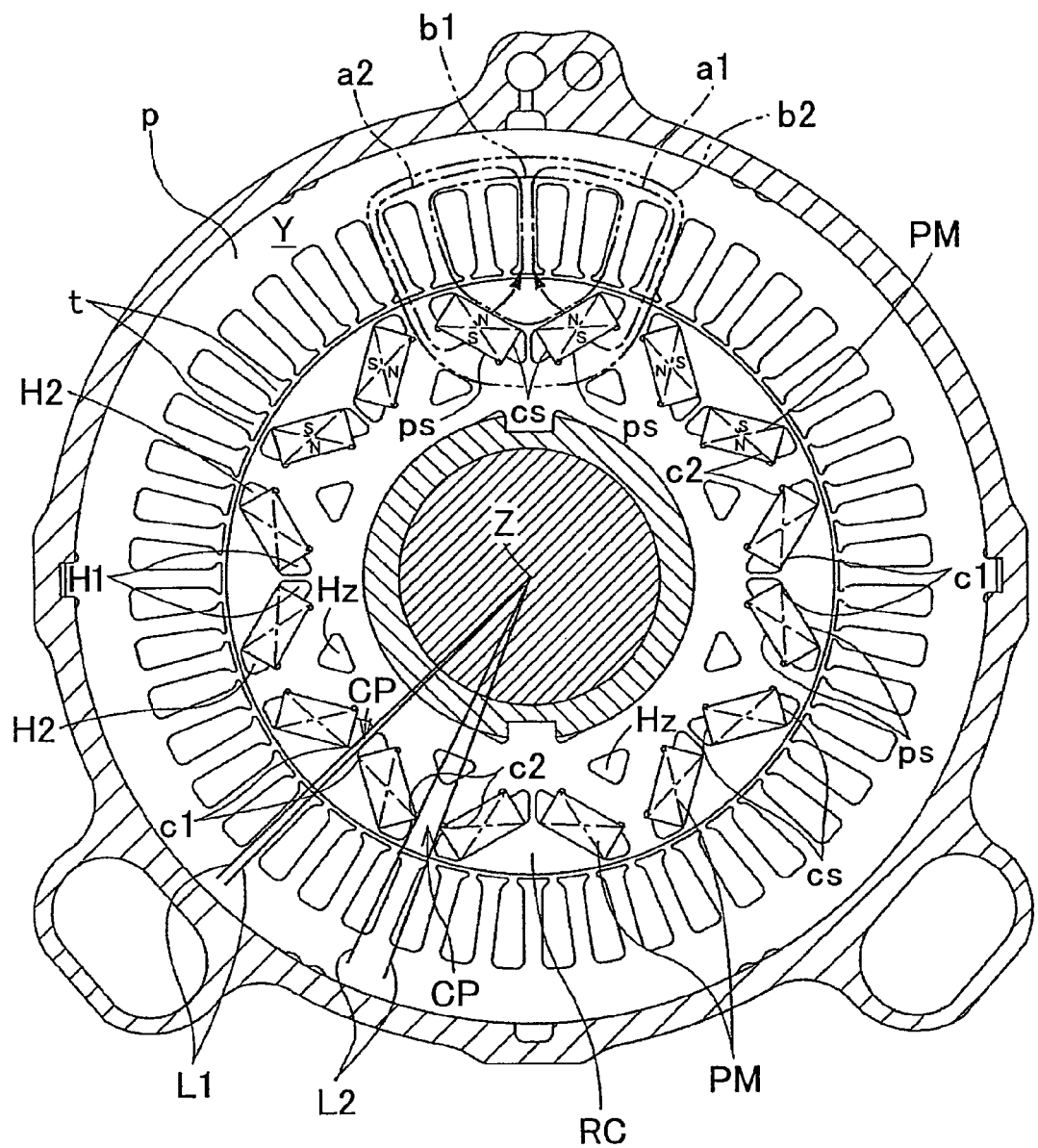
FIG. 6 is an explanatory diagram showing magnetic flux distribution in the case where an arrangement structure of permanent magnets according to the present invention is used.

As can be seen from FIG. 6, a unique structure is used to arrange the permanent magnets PM in the rotor R. Eight V-shaped magnet pairs, each formed by arranging a pair of permanent magnets PM so as to form a V-shape, are evenly distributed in the circumferential direction of a central axis Z. Therefore, a total of 16 permanent magnets PM are accommodated in the rotor core RC.

The arrangement of the V-shaped magnet pairs will now be described in more detail. Each pair of permanent magnets PM is arranged so that closely positioned commutating pole faces cs that are relatively close to each other are positioned on the inner-diameter side and distantly positioned commutating pole faces cs that are relatively far away from each other are positioned on the outer-diameter side. Accordingly, in this structure, the valley of the V-shape is located on the inner-diameter side.

N and S polarities of each pair of permanent magnets PM will now be described. Closely positioned pole faces ps (the pole faces positioned on the outer-diameter side in the radial direction) have the same polarity (N polarity in the pair of permanent magnets PM whose magnetic flux distribution is shown in FIG. 6), and distantly positioned magnetic pole faces ps (the pole faces positioned on the inner-diameter side in the radial direction) have the same polarity (S polarity in the pair of permanent magnets PM whose magnetic flux distribution is shown in FIG. 6).

The V-shaped magnet pairs are arranged so that the arrangement of N and S polarities in the pole faces ps is reversed between circumferentially adjacent V-shaped magnet pairs. More specifically, in the V-shaped magnet pair whose magnetic flux distribution is shown in FIG. 6, N polarity is provided on the outer-diameter side. On the other hand, in the adjacent V-shaped magnet pairs located on both sides of this V-shaped magnet pair in the circumferential direction, S polarity is provided on the outer-diameter side.

Between the pair of permanent magnets PM and the stator S, magnetic flux distribution relating to the magnetic torque is as shown by a chain line in FIG. 6. In each permanent magnet PM, magnetic flux leaves one pole face ps, goes through a yoke portion Y of the stator S, and reaches the other pole face ps (shown by a1 and a2 in FIG. 6). On the other hand, magnetic flux distribution relating to the reluctance torque is as shown by a two-dot chain line. In the V-shaped magnet pair, magnetic flux first goes along one pole face ps (N or S polarity) of the pole face pair ps, then enters the stator S from a position close to that pole face ps, passes through the yoke portion Y of the stator S, and then returns to the vicinity of the original pole face ps. As shown in FIG. 6, there are two magnetic flux distributions in a pair of permanent magnets PS of each V-shaped magnet pair: distribution (shown by b1 in FIG. 6) from a position that is located close to the permanent magnet and on the outer-diameter side of both permanent magnets PM into the stator S; and distribution (shown by b2 in FIG. 6) from a position located close to the permanent magnet and on the inner-diameter side of both permanent magnets PM into the stator S.

In the rotor core RC of the present invention, a pair of voids H1, H2 for preventing leakage flux are respectively provided adjacent to the commutating pole faces cs of each permanent magnet PM accommodated in the core so as to extend along the entire axial width of the rotor main body R1. Accordingly, as shown in FIG. 1, the voids H1, H2 are in contact with the retainers RL, RR at their axial ends.

The shape of the voids H1, H2 will now be described in detail. The voids H1, H2 for preventing leakage flux are provided for each permanent magnet PM as a combination of an inner-diameter-side void H1 located on the inner-diameter side and an outer-diameter-side void H2 located on the outer-diameter side.

As can be seen from FIG. 6, the voids H1, H2 have a substantially triangular shape.

The inner-diameter-side void H1 is shaped so that its one side corresponds to the commutating pole face cs of the permanent magnet PM and another side located on the inner-diameter side extends along the extended line of the linear pole face ps of the permanent magnet PM. The remaining side is located on the permanent magnet side with respect to a line (this line is referred to as an inner-diameter-side connecting line and is shown by L1 in FIG. 6) connecting the position of the central axis Z of the rotor core RC with the position of a commutating-pole-side end c1 of the permanent magnet PM and extends along the connecting line L1. When viewed in cross section shown in FIG. 6, the commutating-pole-side ends c1 are the ends (an example of the closest portions) which are the closest to each other in the circumferential direction in each pair of permanent magnets PM arranged in a V-shape, and are the ends which are the farthest from each other between adjacent V-shaped magnet pairs. By using this structure, leakage flux can be suppressed in a pair of permanent magnets PM forming a V-shaped magnet pair.

The outer-diameter-side void H2 is shaped so that its one side corresponds to the commutating pole face cs of the permanent magnet PM and another side located on the outer-diameter side extends along the circumferential outer periphery of the rotor core RC. The remaining side is located on the permanent magnet side with respect to a line (this line is referred to as an outer-diameter-side connecting line and is shown by L2 in FIG. 6) connecting the position of the central axis Z of the rotor core RC with the position of a commutating-pole-side end c2 of the permanent magnet PM and extends along the connecting line L2. When viewed in cross section shown in FIG. 6, the commutating-pole-side ends c2 are the ends which are the farthest from each other in the circumferential direction in each pair of permanent magnets PM arranged in a V-shape, and are the ends (an example of the closest portions) which are the closest to each other between adjacent V-shaped magnet pairs. By using this structure, a commutating pole portion can be assured in a region between adjacent V-shaped magnet pairs, and magnetic flux can be reliably applied into the stator S in this region, whereby leakage flux can be suppressed.

Moreover, as shown in FIG. 6, lightening holes Hz are provided at positions on the inner-diameter side of the V-shaped magnet pairs so as to extend along the whole axial width of the rotor main body R1. Each hole Hz has a triangular cross section with an apex of the triangle located on the outer-diameter side.

The structure of the rotor R of this embodiment has been described above. In the present invention, the above-described voids H1, H2 for preventing leakage flux are used to cool the rotor R.

Cooling of the Rotor

Hereinafter, cooling of the permanent magnets PM accommodated in the rotor R will be described.

As shown in FIG. 1, a cooling liquid is introduced from the left retainer RL into the voids H1, H2 and is then discharged to the right retainer RR and to the outside of the right retainer RR in the axial direction. The cooling liquid is thus supplied from the inner-diameter side to the coil end CE located on the side of the right retainer RR, whereby the inner-diameter surface of the coil end CE is cooled.

As shown in FIG. 1, a rotor cooling-liquid supply passage rs is provided so as to communicate with the voids H1, H2 from the above-described common inlet passage ci through the left retainer RL. This rotor cooling-liquid supply passage rs is formed by a left-cover flow passage rs1 communicating with an inner-diameter-side portion of the common inlet passage ci in the axial direction and opening at the right end face of the left cover MCL, a connecting flow passage rs2 connecting the opening of the left-cover flow passage rs1 with a cooling-liquid receiving portion provided in the left retainer RL, and a retainer flow passage rs3. The connecting flow passage rs2 and the retainer flow passage rs3 are fixedly provided in the left cover MCL and are formed by a pair of cylindrical members (an inner-diameter-side flow passage component p1 and an outer-diameter side flow passage component p2) respectively located on the inner-diameter side and the outer-diameter side in the radial direction.

The following structure is used for the connecting flow passage rs2: the connecting flow passage rs2 receives a cooling liquid between the inner-diameter-side flow passage component p1 and the outer-diameter-side flow passage component p2, and introduces the cooling liquid into the left retainer RL through a cylindrical inlet passage formed between the outer-diameter-side flow passage component p2 and the outer-diameter surface of the rotating shaft A of the rotor R on the left retainer RL side.

As shown in FIGS. 1 and 7, the retainer flow passage rs3 includes a ring-shaped inner-diameter-side reservoir portion r1 provided at the retainer-side end of the outer-diameter-side flow passage component p2 and a ring-shaped outer-diameter-side reservoir portion r2 provided near the retainer-side end of the outer-diameter-side flow passage component p2 and on the outer-diameter side of the outer-diameter-side flow passage component p2.

On the other hand, a ring-shaped inner-diameter-side distributing portion t1 and a ring-shaped outer-diameter-side distributing portion t2 respectively communicating with the voids H1, H2 are provided at the surface of the left retainer RL which is in contact with the rotor core RC. The inner-diameter-side reservoir portion r1 communicates with the inner-diameter-side distributing portion t1 through a plurality of inner-diameter-side throttled passages u1, and the outer-diameter-side reservoir portion r2 communicates with the outer-diameter-side distributing portion t2 through a plurality of outer-diameter-side throttled passages u2. Accordingly, a cooling liquid can be independently introduced from the common inlet passage ci into the inner-diameter-side distributing portion t1 and the outer-diameter-side distributing portion t2.

Moreover, by providing the inner-diameter-side throttled passages u1 and the outer-diameter-side throttled passages u2, a certain amount of cooling liquid can be assured on the side of the distributing portions t1, t2.

The cooling liquid flows from the inner-diameter-side distributing portion t1 into the above-described inner-diameter-side voids H1 and from the outer-diameter-side distributing portion t2 into the above-described outer-diameter-side voids H2.

On the other hand, as shown in FIG. 1, a ring-shaped gathering portion v that communicates in common with the voids H1, H2 is provided on the surface of the right retainer RR which is in contact with the rotor core RC, so that the cooling liquid flowing out of both the inner-diameter-side voids H1 and the outer-diameter-side voids H2 gather in the gathering portion v. This gathering portion v is provided as an axially thin recess at the left end face of the right retainer RR. The cooling liquid that has flown through the inner-diameter-side voids H1 and the outer-diameter-side voids H2 is biased toward the outer-diameter side of the gathering portion v by the centrifugal force generated by rotation of the rotor R. Cooling-liquid diffusing passages x for diffusing the cooling liquid to the inner-diameter surface of the right coil end CE is provided so as to extend from the outer-diameter-side portion of the gathering portion v to the right end face of the right retainer RR.

Accordingly, the cooling liquid that has cooled the rotor core while flowing through the inner-diameter-side voids H1 and the outer-diameter-side voids H2 is diffused from the cooling-liquid diffusing passages x to the inner-diameter surface of the right coil end CE, whereby the right coil end CE can be cooled.

As shown in FIGS. 1, 4A, 4B, and 5, in order to appropriately adjust supply of the cooling liquid to each part, a throttled portion is formed as cooling-liquid supply amount adjusting mechanism for adjusting the amount of cooling liquid to be supplied to each supply passage scs, ces, rs. The amount of cooling liquid to be supplied is thus adjusted between the rotor cooling-liquid supply passage rs and the stator-core cooling-liquid supply passage scs and the coil-end cooling-liquid supply passage ces. In this embodiment, a cross-section regulating member y for regulating a flow passage cross-section is provided near the inlet of the stator-core cooling-liquid supply passage scs and the coil-end cooling-liquid supply passage ces (more specifically, at the left end face of the case main body MC1 which is in contact with the left cover MCL). As a result, the amount of cooling liquid to be supplied to the rotor cooling-liquid supply passage rs can be adjusted appropriately.

Other Embodiments (1) In the above embodiment, in order to mount the permanent magnets PM in the stator core SC, pairs of rectangular parallelepiped permanent magnets PM are arranged so that each permanent magnet pair forms a V-shape in a cross section orthogonal to the rotating shaft A, and the inner-diameter-side voids H1 and the outer-diameter-side voids H2 are formed in contact with the respective commutating pole faces cs of each pair of permanent magnets PM.

The above structure is appropriate when each pair of permanent magnets PM is arranged in a V-shape. As well known, however, a plurality of permanent magnets PM may be circumferentially arranged at predetermined positions (as far to the outer-diameter side as possible) in the radial direction, with a commutating pole portion CP formed between the permanent magnets PM. An example of this structure is shown in FIG. 8.

Figure 8:
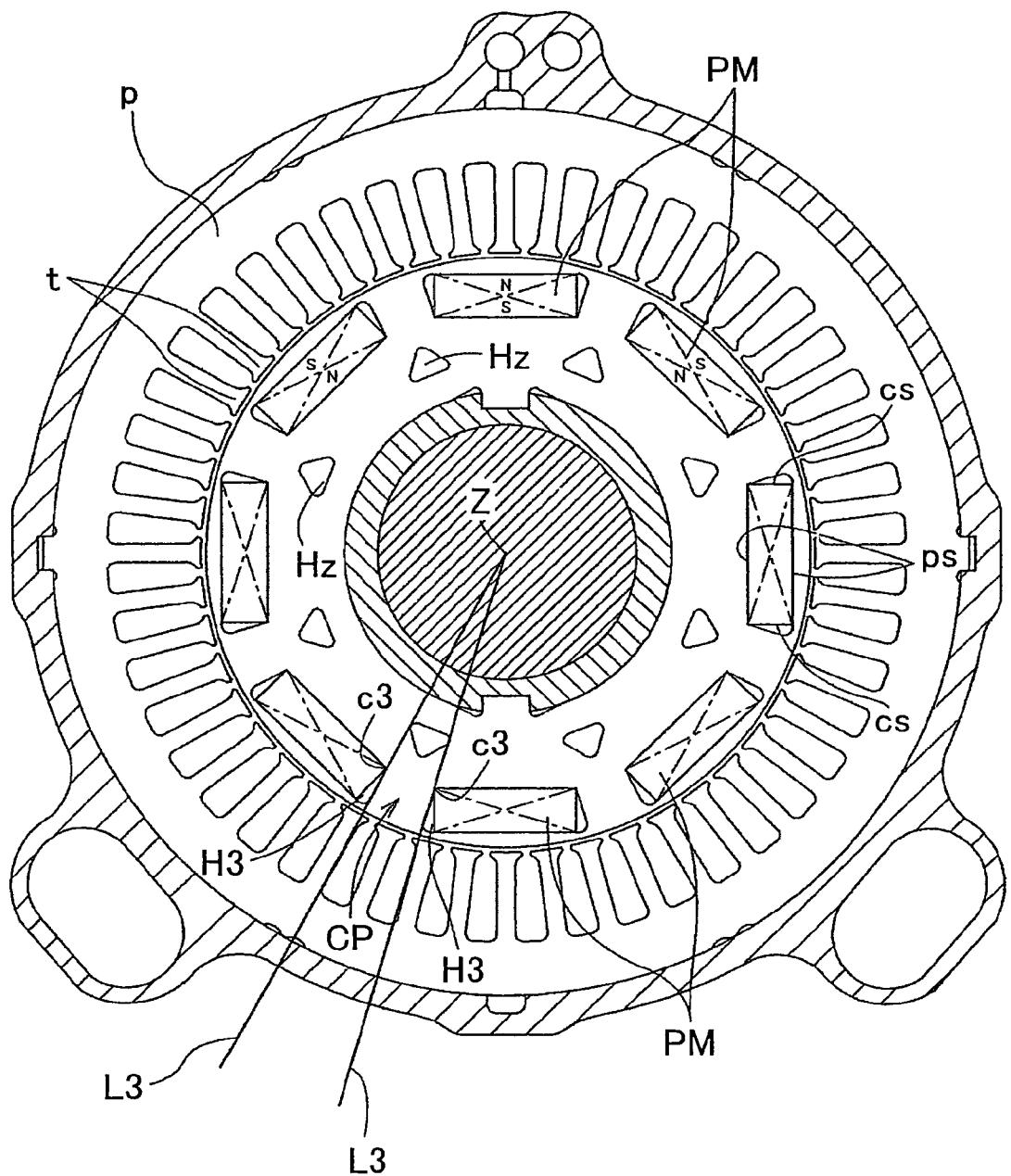
FIG. 8 is a diagram showing an arrangement structure of permanent magnets according to another embodiment of the present invention.

As can be seen from FIG. 8, in this arrangement of the permanent magnets PM in the rotor R, a commutating pole portion CP is formed between adjacent permanent magnets PM, and eight permanent magnets PM are evenly distributed in the circumferential direction of the central axis Z. Accordingly, eight permanent magnets PM are accommodated in the rotor core RC. In this example, pole faces ps extend substantially in the circumferential direction. The arrangement of N and S polarities in the pole faces ps is reversed between the adjacent permanent magnets PM in the circumferential direction.

In the present invention, the voids for preventing leakage flux are used to distribute a cooling liquid. In this example, voids H3 respectively formed in contact with commutating pole faces cs of the permanent magnets PM are formed as follows.

In this embodiment as well, the voids H3 have a substantially triangular shape.

More specifically, each void H3 is shaped so that its one side corresponds to the commutating pole face cs of the permanent magnet PM and another side located on the outer-diameter side extends along the extension of the pole face ps located on the outer-diameter side of the permanent magnet PM. The remaining side is located on the permanent magnet side with respect to a line (shown by L3 in FIG. 8) connecting the position of the central axis Z of the rotor core RC with the position of a commutating-pole-side end c3 located on the inner-diameter side of the permanent magnet PM and extends along the connecting line L3. When viewed in cross section shown in FIG. 8, the commutating-pole-side ends c3 are the ends (an example of the closest portions) which are the closest to each other in the circumferential direction in adjacent permanent magnets PM arranged in the circumferential direction. By using this structure, magnetic flux can be reliably applied into the stator S in a region between adjacent permanent magnets, whereby leakage flux can be suppressed.

As shown in FIG. 8, in this example as well, lightening holes Hz are provided at positions on the inner-diameter side between the permanent magnets so as to extend along the whole axial width of the rotor main body R1. Each hole Hz has a triangular cross section with an apex of the triangle located on the outer-diameter side.

Even in the structure in which the permanent magnets PM are arranged as described above, the voids H3 can be used as a distributing passage of the cooling liquid.

In the arrangement of the permanent magnets PM shown in FIG. 8, a plurality of permanent magnets PM are circumferentially arranged as far to the outer-diameter side as possible with a commutating pole portion CP formed between the permanent magnets PM. In addition to this arrangement structure, a total of three pairs of permanent magnets PM may be circumferentially arranged on the inner-diameter side of the permanent magnets PM so that each pair of permanent magnets PM forms a V-shape as shown in FIG. 6.

(2) An example in which a cooling liquid is supplied from the side of the left cover is shown in the above embodiment. However, the side from which a cooling liquid is supplied is not limited to the left cover or the right cover, and the cooling liquid may be supplied from the side of either the right or left cover.

(3) An example in which both cooling of the rotor and cooling of the stator can be performed is shown in the above embodiment. However, the structure in which only the rotor can be cooled may be used.

(4) An example in which both cooling of the stator core and cooling of the coil ends can be performed in addition to cooling of the rotor core (permanent magnets) is shown in the above embodiment. However, a structure in which cooling of only the stator core or cooling of only the coil ends can be performed in addition to cooling of the rotor core may be used.

(5) An example in which a lubricating oil that is capable of lubricating a bearing is used as a cooling liquid is shown in the above embodiment. In the present invention, however, since at least the rotor core needs to be cooled, a structure in which another cooling liquid is supplied to the rotor core may be used.

(6) In the above embodiment, as can be seen from FIG. 1, when a cooling liquid is supplied from the inlet in to the outer diameter portion of the stator core SC, the left and right coil ends CE, and the voids H1, H2 provided in the rotor main body MC1, the cooling liquid is supplied to the predetermined positions by using a single case main body MC1 and a single left cover MCL. However, for example, the case main body may be formed by a plurality of members and one of the plurality of members may be used as a dedicated member for forming a cooling-liquid supply passage. Such a dedicated member for forming a cooling-liquid supply passage may also be provided for the cover.

According to an exemplary aspect of the invention, in the rotor core of the rotor having the cooling structure of the rotating electrical machine according to the present invention, the voids for preventing leakage flux are provided in contact with the respective permanent magnets accommodated in the rotor core so as to extend through the rotor core in an axial direction (between the core end faces of the rotor core). By providing the voids for preventing leakage flux, excellent magnetic flux distribution is obtained between the permanent magnets and the stator core, whereby capability as a rotating electrical machine can be sufficiently provided.

Moreover, in the cooling structure of the rotating electrical machine according to the present invention, the cooling liquid is supplied to the voids for preventing leakage flux which are respectively provided in contact with the permanent magnets. Cooling of the permanent magnets can thus be performed favorably by using the voids. Moreover, each of the voids for preventing leakage flux functionally has a predetermined shape with its one face corresponding to a surface (a side in cross section) of a corresponding permanent magnet which extends in the direction connecting the magnetic poles of the permanent magnet. In other words, each void has a predetermined shape with its one face being in contact with that surface of the permanent magnet. Therefore, the cooling liquid flowing through the voids cools the permanent magnets by directly contacting those surfaces of the permanent magnets. As a result, high cooling capability can be obtained.

In the case where this cooling structure of the rotating electrical machine is used, in a method for cooling a rotating electrical machine including a stator and a rotor, magnet accommodating holes are provided in a rotor core of the rotor so as to extend between axial core end faces, permanent magnets are respectively accommodated in the magnet accommodating holes, and voids for preventing leakage flux are provided respectively in contact with the permanent magnets so as to extend between the axial core end faces in the rotor core. In this cooling method, a cooling liquid is supplied to one core end face, the supplied cooling liquid is introduced into the voids for preventing leakage flux, and the rotor is cooled by the cooling liquid flowing through the voids.

According to various exemplary aspects of the invention, the voids for preventing leakage flux have the following shape regarding the permanent magnets.

In a cross section orthogonal to the rotating shaft, each of the permanent magnets accommodated in the rotor core has a pair of faces serving as magnetic poles (in the specification, these faces are referred to as pole faces) and faces extending in the direction connecting the magnetic poles (in the specification, these faces are referred to as commutating pole faces; these faces face a commutating pole portion interposed between the permanent magnets). Magnetic flux of each permanent magnet distributes from one pole face toward the other. Accordingly, each permanent magnet has a pair of commutating pole faces. In the present invention, a pair of voids for preventing leakage flux are provided for each permanent magnet, and the pair of commutating pole faces of each permanent magnet serve as respective one end faces of the pair of voids. Accordingly, generation of leakage flux can be favorably prevented, and cooling of the permanent magnets can be favorably performed by supplying the cooling liquid to each pair of voids formed respectively in contact with the commutating faces of a corresponding permanent magnet.

Moreover, each void is formed between a line connecting the central axis of the rotor core with a corresponding one of the closest portions located closest to each other in the circumferential direction of the rotating shaft in a pair of permanent magnets located adjacent to each other in the circumferential direction of the rotating shaft and a side of a permanent magnet having the closest portion which extends from the closest portion in the direction connecting magnetic poles of the permanent magnet. Therefore, a magnetic path of magnetic flux formed by the permanent magnets can be assured, whereby an excellent operating state of the rotating electrical machine itself can be ensured.

In this structure, the cooling liquid to be supplied is stored in the reservoir portion and is also supplied to the distributing portion. When the cooling liquid is supplied from the distributing portion to the voids, the cooling liquid is prevented from flowing backward from the distributing portion to the reservoir portion. As a result, the cooling liquid can be stably supplied to the voids.

Moreover, by locating the distributing portion radially on the outer diameter side with respect to the reservoir portion, the cooling liquid can be stably supplied to the voids by utilizing the centrifugal force generated by rotation of the rotor.

According to various exemplary aspects of the invention, in the cooling structure of the rotating electrical machine, the cooling liquid needs to be supplied to one core end face of the rotor core through the rotor cooling-liquid supply passage. Since at least a part of the rotor cooling-liquid supply passage is formed by the outer-diameter surface of the rotating shaft and the flow passage component located on the outer-diameter side with respect to the outer-diameter surface, the rotor cooling-liquid supply passage can be favorably formed while suppressing the number of components.

The rotor cooling-liquid supply passage has been described above. In the cooling structure of the rotating electrical machine of the present invention, the cooling liquid is supplied into the voids from one core end face and is discharged from the other core end face. Accordingly, the discharged cooling liquid can be effectively utilized.

According to various exemplary aspects of the invention, by diffusing the cooling liquid received from the voids to the inner-diameter surface of the coil end through the cooling-liquid diffusing passage, the coil end located at the other core end face can be favorably cooled.

In the method for cooling the rotating electrical machine using the above structure, the coil end is cooled by diffusing the cooling liquid flowing through the voids for preventing leakage flux and flowing out of the other core end face to the inner-diameter surface of the coil end.

Hereinafter, a unique arrangement structure of the permanent magnets according to the present invention will be described. This arrangement structure is intended to enable the voids for preventing leakage flux to sufficiently provide the leakage-flux preventing function, and to assure the volume of the voids themselves and thus ensure the amount of cooling liquid flowing through the voids.

According to various exemplary aspects of the invention, in the cross section orthogonal to the rotating shaft, a relatively large space is obtained between a line connecting a central axis of the rotor core with a corresponding one of closest portions located closest to each other in a circumferential direction in a pair of permanent magnets located adjacent to each other in the circumferential direction and a side of a permanent magnet having the closest portion which extends from the closest portion in a direction connecting magnetic poles of the permanent magnet. Therefore, the amount of cooling liquid flowing through the voids can be assured while favorably preventing leakage flux. As a result, a rotating electrical machine that has excellent capability as a rotating electrical machine, is capable of favorably cooling the permanent magnets, and is less likely to cause irreversible demagnetization due to overheating can be obtained.

According to various exemplary aspects of the invention, the radial position of the voids is varied between the inner-diameter side void and the outer-diameter side void. In this case, the individual size of the voids can be easily assured as compared to the case where the voids are located at the same radial position. Moreover, by independently supplying the cooling liquid into the inner-diameter-side void and the outer-diameter-side void, problems such as variation in the supply amount of cooling liquid depending on the operating state of the rotor can be relatively easily eliminated.

According to various exemplary aspects of the invention, the cooling liquid flows through the voids from one core end face toward the other end face, and is then introduced into the cooling-liquid diffusing passage. By locating the cooling-liquid diffusing passage radially on the outer-diameter side with respect to the radial position of at least one of the voids, the cooling liquid can be easily introduced into the cooling-liquid diffusing passage and into the coil end by utilizing the centrifugal force that is applied to the cooling liquid along with rotation of the rotor.

According to various exemplary aspects of the invention, the cooling liquid separately flowing through the outer-diameter-side void and the inner-diameter-side void is gathered in the gathering portion, and then supplied to the cooling-liquid diffusing passage. The cooling liquid is then diffused to the inner-diameter surface of the coil end, whereby the inner-diameter surface of the coil end can be cooled favorably.

In the present invention, the cooling liquid is supplied to the voids for preventing leakage flux and the permanent magnets are directly cooled by the cooling liquid. Accordingly, this structure can of course be used even in the rotating electrical machine in which a plurality of permanent magnets are arranged in a circumferential direction of the rotating shaft, and at least one of pole faces of each permanent magnet faces toward a direction orthogonal to a radial direction.

Even in a commonly used rotating electrical machine in which a plurality of permanent magnets are arranged in a circumferential direction of the rotating shaft, and at least one of pole faces of each permanent magnet faces toward a direction orthogonal to a radial direction, the permanent magnets can be directly cooled by the cooling liquid by using the voids for preventing leakage flux as disclosed in the present invention, while maintaining appropriate output power of the rotating electrical machine. As a result, a rotating electrical machine that is less likely to cause irreversible demagnetization due to overheating can be obtained.

According to various exemplary aspects of the invention, by providing one or both of the stator-core cooling-liquid supply passage and the coil-end cooling-liquid supply passage, and by providing one or both of cooling of the stator core and cooling of the outer-diameter surface of the coil end, a temperature rise in the rotor and the stator can be appropriately suppressed.

According to various exemplary aspects of the invention, by providing the cooling-liquid supply amount adjusting mechanism, the amount of cooling liquid is adjusted between the rotor cooling-liquid supply passage and the supply passage other than the rotor cooling-liquid supply passage. Therefore, even when the overall amount of cooling liquid to be supplied is limited, the amount of cooling liquid to be supplied from the rotor cooling-liquid supply passage can be appropriately adjusted and ensured.

What is claimed is:

1. A cooling structure of a rotating electrical machine including a stator and a rotor, the cooling structure comprising:
    magnet accommodating holes provided in a rotor core of the rotor, the magnet accommodating holes extend between axial core end faces of the rotor core, wherein permanent magnets are accommodated in the magnet accommodating holes;
    a plurality of voids, which prevent leakage flux, in contact with the permanent magnets and extending between the axial core end faces; and
    a rotor cooling-liquid supply passage that supplies cooling liquid to one core end face, wherein:
        the cooling liquid supplied from the rotor cooling-liquid supply passage is introduced into the voids to prevent leakage flux,
        the permanent magnets are cooled by the cooling liquid flowing through the voids,
        a pair of voids are provided for each permanent magnet, each void having one end face corresponding to a surface of a corresponding permanent magnet that faces a commutating pole portion interposed between the permanent magnets, and
        in a cross section orthogonal to a rotating shaft, each void is formed between a line connecting a central axis of the rotor core with a corresponding one of closest portions located closest to each other in a circumferential direction of the rotating shaft of a pair of the permanent magnets located adjacent to each other in the circumferential direction of the rotating shaft and a side of a permanent magnet having the closest portion which extends from the closest portion in a direction connecting magnetic poles of the permanent magnet.

2. The cooling structure according to claim 1, further comprising:
    a distributing portion that communicates with the voids is provided on a void side of the rotor cooling-liquid supply passage; and
    a reservoir portion that stores the cooling liquid is provided upstream of the distributing portion, wherein:
    the distributing portion and the reservoir portion communicate with each other through a throttled passage.

3. The cooling structure according to claim 2, wherein at least a part of the rotor cooling-liquid supply passage is formed between an outer-diameter surface of the rotating shaft and a flow passage component located on an outer-diameter side with respect to the outer-diameter surface.

4. The cooling structure according to claim 3, further comprising:
    a cooling-liquid diffusing passage that receives the cooling liquid from the other core end face through the voids, wherein:
    a coil end of the stator is cooled by diffusing the cooling liquid from the cooling-liquid diffusing passage to an inner-diameter surface of the coil end.

5. The cooling structure according to claim 4, further comprising:
    a plurality of V-shaped magnetic pairs, wherein:
    each V-shaped magnetic pair is formed by arranging a pair of the permanent magnets to form a V-shape in the cross section orthogonal to the rotating shaft, and
    a valley of the V-shape is located on an inner-diameter side.

6. The cooling structure according to claim 5, wherein:
    an inner-diameter-side void located on the inner-diameter side and an outer-diameter-side void located on an outer-diameter side are provided as the voids that prevent leakage flux, and
    the cooling liquid is supplied from the rotor cooling-liquid supply passage into the inner-diameter-side void and the outer-diameter-side void independently.

7. The cooling structure according to claim 6, wherein the cooling-liquid diffusing passage is radially located on an outer-diameter side with respect to a radial position of at least one of the voids.

8. The cooling structure according to claim 6, further comprising:
    a gathering portion that gathers the cooling liquid flowing out of the inner-diameter-side void and the outer-diameter-side void, wherein:
    the cooling-liquid diffusing passage diffuses the cooling liquid flowing from the voids into the gathering portion to an inner-diameter surface of a coil end, and
    the coil end is cooled by diffusing the cooling liquid flowing from the voids into the cooling-liquid diffusing passage to the inner-diameter surface of the coil end.

9. The cooling structure according to claim 4, wherein:
    a plurality of the permanent magnets are arranged in a circumferential direction, and
    at least one pole face of each permanent magnet faces toward a direction orthogonal to a radial direction.

10. The cooling structure according to claim 9, further comprising:
    one or both of a stator-core cooling-liquid supply passage that supplies the cooling liquid to the stator core of the stator and a coil-end cooling-liquid supply passage that supplies the cooling liquid to an outer-diameter surface of a coil end.

11. The cooling structure according to claim 10, further comprising:
a cooling-liquid supply amount adjusting mechanism that adjusts an amount of cooling liquid between the rotor cooling-liquid supply passage and a supply passage other than the rotor cooling-liquid supply passage.

12. The cooling structure according to claim 1, wherein at least a part of the rotor cooling-liquid supply passage is formed between an outer-diameter surface of the rotating shaft and a flow passage component located on an outer-diameter side with respect to the outer-diameter surface.

13. The cooling structure according to claim 1, further comprising:
a cooling-liquid diffusing passage that receives the cooling liquid from the other core end face through the voids is provided, wherein:
a coil end of the stator is cooled by diffusing the cooling liquid from the cooling-liquid diffusing passage to an inner-diameter surface of the coil end.

14. The cooling structure according to claim 1, further comprising:
a plurality of V-shaped magnetic pairs, wherein:
each V-shaped magnetic pair is formed by arranging a pair of the permanent magnets to form a V-shape in a cross section orthogonal to a rotating shaft, and
a valley of the V-shape is located on an inner-diameter side.

15. The cooling structure according to claim 1, wherein:
a plurality of the permanent magnets are arranged in a circumferential direction, and
at least one pole face of each permanent magnet faces toward a direction orthogonal to a radial direction.

16. The cooling structure according to claim 1, further comprising:
one or both of a stator-core cooling-liquid supply passage that supplies the cooling liquid to a stator core of the stator and a coil-end cooling-liquid supply passage that supplies the cooling liquid to an outer-diameter surface of a coil end.

17. A method for cooling a rotating electrical machine including a stator and a rotor with a cooling structure comprising magnet accommodating holes provided in a rotor core of the rotor so as to extend between axial core end faces of the rotor core, wherein permanent magnets are accommodated in the magnet accommodating holes, and a plurality of voids that prevent leakage flux in contact with the permanent magnets so as to extend between the axial core end faces of the rotor core, the method comprising:
supplying a cooling liquid to one core end face, wherein the supplied cooling liquid is introduced into the voids that prevent leakage flux, and the permanent magnets are cooled by the cooling liquid flowing through the voids,
wherein a coil end is cooled by diffusing the cooling liquid flowing through the voids that prevent leakage flux and flowing out from the other core end face to an inner-diameter surface of the coil end.

18. A method for cooling a rotating electrical machine including a stator and a rotor with a cooling structure comprising magnet accommodating holes provided in a rotor core of the rotor so as to extend between axial core end faces of the rotor core, wherein permanent magnets are accommodated in the magnet accommodating holes, and a plurality of voids that prevent leakage flux in contact with the permanent magnets so as to extend between the axial core end faces of the rotor core, the method comprising:
supplying a cooling liquid to one core end face, wherein the supplied cooling liquid is introduced into the voids that prevent leakage flux, and the permanent magnets are cooled by the cooling liquid flowing through the voids, wherein:
a pair of voids are provided for each permanent magnet,
each void having one end face corresponding to a surface of a corresponding permanent magnet that faces a commutating pole portion interposed between the permanent magnets, and
in a cross section orthogonal to a rotating shaft, each void is formed between a line connecting a central axis of the rotor core with a corresponding one of closest portions located closest to each other in a circumferential direction of the rotating shaft of a pair of the permanent magnets located adjacent to each other in the circumferential direction of the rotating shaft and a side of a permanent magnet having the closest portion which extends from the closest portion in a direction connecting magnetic poles of the permanent magnet.

* * * * *